April 15, 1930.                    A. MOORE                    1,754,643
        ANTIDETONATION CYLINDER HEAD FOR INTERNAL COMBUSTION ENGINES
                    Filed Jan. 3, 1927        2 Sheets-Sheet 1
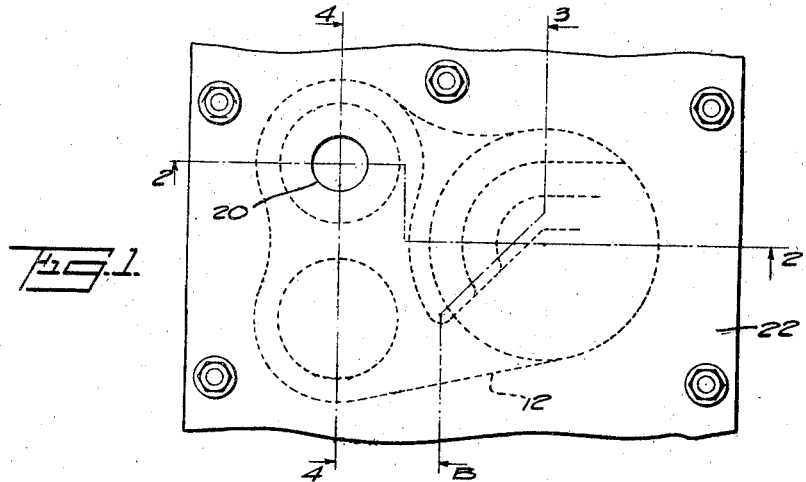
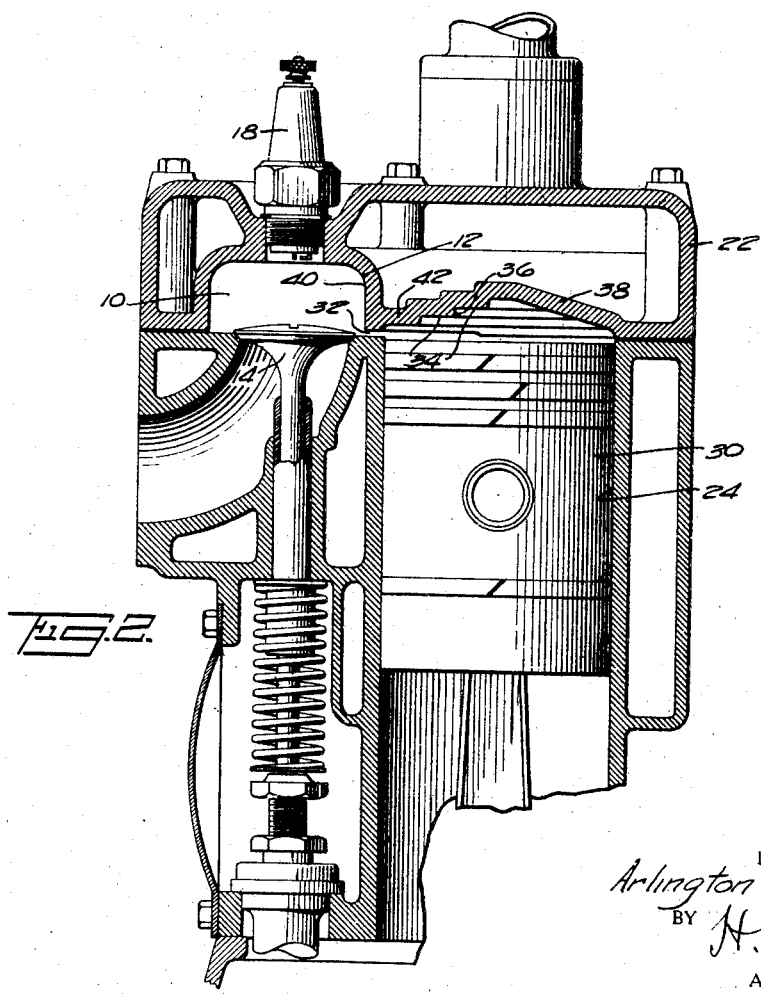
INVENTOR
Arlington Moore
BY H. H. Dyke
ATTORNEY April 15, 1930.                A. MOORE                1,754,643
         ANTIDETONATION CYLINDER HEAD FOR INTERNAL COMBUSTION ENGINES
                    Filed Jan. 3, 1927     2 Sheets-Sheet 2
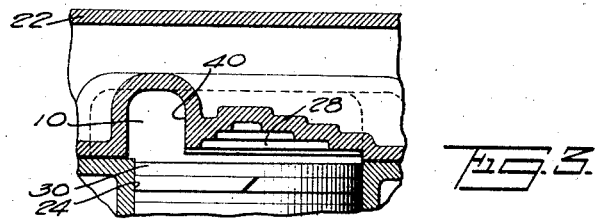
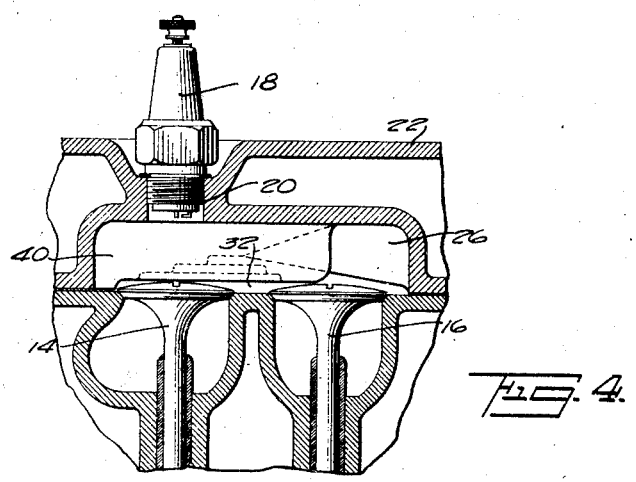
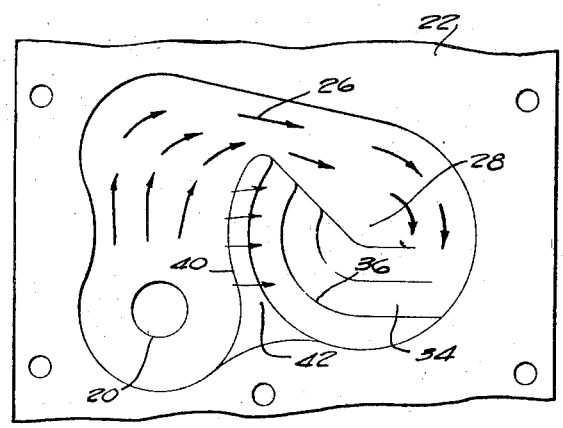
INVENTOR
Arlington Moore
BY
H. H. Dyke
ATTORNEY Patented Apr. 15, 1930

1,754,643

UNITED STATES PATENT OFFICE

ARLINGTON MOORE, OF NEW YORK, N. Y.

ANTIDETONATION CYLINDER HEAD FOR INTERNAL-COMBUSTION ENGINES

Application filed January 3, 1927. Serial No. 158,484.

My invention is of a cylinder head for internal combustion engines. The object of the invention is the provision of a cylinder head which is so constructed as to prevent detonation and preignition.

The inventionn is illustrated herein as applied to an L-head engine to which it is well adapted, but may be made use of with other engines. L-head engines can be equipped at manufacture with cylinder heads of my invention, or new heads can be installed as a replacement proposition on old engines.

In the accompanying drawings, Fig. 1 is a fragmentary plan view of a cylinder head with the top wall or ceiling of the combustion chamber therein indicated by dotted lines. Figs. 2, 3 and 4 are sectional views on the lines 2—2, 3—3, and 4—4, respectively, of Fig. 1, and Fig. 5 is a fragmentary plan view of a cylinder head shown as being taken off the engine and inverted.

With my invention as applied to an L-head engine, the end 10 of the combustion chamber 12 which is over the inlet valve 14 and exhaust valve 16, is left wide open in the usual manner so as to permit free valve movement and provide plenty of room for ingress and egress movements of the charge gases and the gaseous products of combustion.

The spark plug 18 is preferably located in the hole 20 formed in the cylinder head 22 over the intake valve 14.

Adjacent to the space 10 over the valves and toward the cylinder bore 24, I form the cylinder head wall so that, while on the side adjacent to the exhaust valve there is a freely opening passage 26 of the full height of the combustion chamber from the over-valve part 10 of the combustion chamber 12 to that part 28 of the combustion chamber over the cylinder bore 24 and the head of piston 30, the passage thereto throughout the remainder of the width of the combustion chamber and, particularly in that part adjacent to the inlet valve 14, is quite narrow or small in its vertical dimension, as indicated at 32, thereby producing a retarded or delayed movement of gases therethrough relatively to their free movement through the open passage 26.

Beyond the narrow or low passage 32, the ceiling of the part 28 of the combustion chamber 12 is raised by gradual steps, as by the provision of flat or tread surfaces 34 and riser surfaces 36, which are preferably of substantially concentric arcuate formation when viewed in plan. See Figs. 1 and 5.

At the end of the combustion chamber opposite the over-valve chamber part 10 the roof or ceiling of the over-cylinder chamber part 28 is preferably gradually reduced in height, as by being formed with a gradual downward taper 38.

The operation (necessarily in large part assumed because not directly observable) comprises efficient agitation and mixing of the charge, particularly on the intake stroke, and also, though perhaps with less violence, on the compression stroke due to swirling of the gases which pass freely at 26 and are relatively retarded at 32. On the inlet stroke the principal part of the incoming charge travels from inlet valve 14 through the long way of passage 10, which takes the charge gases directly over the hot exhaust valve 16, heating the gases and cooling the exhaust valve, and through the open passage 26 into the cylinder space along the wall thereof adjacent to the exhaust valve, producing a swirling movement which is not materially changed by the admission of the remainder of the gases through the narrow passage 32. On compression the movement is substantially the reverse of that taking place during intake. The agitation prevents preignition by taking heat from any parts which may tend to get too hot and transferring it to the jacket walls. Upon ignition, at the remote end of space 10, there is a free propagation of flame through 10 and 26 into 28, with relatively retarded flame propagation through 32 into 28, as indicated by heavy and light arrows respectively in Fig. 5, so that the flame wave, from behind the relatively abrupt or straight up and down wall part 40 on the valve side of the projection 42 extending downward in the combustion chamber ceiling, reaches the gases in the combustion chamber part 28 from two directions and at different intervals of time, and furthermore the step and riser construction of the ceiling of the chamber part 28 affords opportunity for repeated expansion steps taking place therein, so that with the capacity for repeated expansion of the gases, and with the agitation which is taking place, and the propagation of flame in different directions and at different intervals of time, there is complete absence of possibility of any stagnant pockets of charge material getting to a condition of temperature and pressure to cause their flashing into self-ignition and thereby producing the effect of so-called detonation.

I claim:

1. A cylinder head for four-cycle L-head internal combustion engines, having relatively high combustion chamber portions over the valves and over the cylinder bore respectively, and having a relatively low passage therebetween on the side adjacent to the intake valve and a relatively high passage therebetween on the side adjacent to the exhaust valve.

2. A cylinder head for four-cycle L-head internal combustion engines, having relatively high combustion chamber spaces over the valves and over the cylinder bore respectively, and a relatively low space therebetween extending from the inlet valve side to relatively closely to the exhaust valve side and a relatively high passage adjacent to the combustion chamber wall at the exhaust valve side.

3. A cylinder head for four-cycle L-head internal combustion engines, having a combustion chamber therein of relatively greater height over the valves and over the cylinder bore, and a realtively low passage therebetween, the height of the ceiling of the combustion chamber over the cylinder bore increasing by gradual steps away from the low passage, and a spark plug over the intake valve.

4. A cylinder head for four-cycle, L-head internal combustion engines, having a combustion chamber therein which is relatively high over the valves and over the cylinder bore respectively, and is relatively low therebetween at the intake valve side and relatively high therebetween at the exhaust valve side, the height of the part over the cylinder bore increasing by abrupt steps away from the valve containing end of the combustion chamber, and a spark plug in said head located substantially over the intake valve position.

5. A cylinder head for four-cycle L-head internal combustion engines, having a combustion chamber therein the ceiling wall whereof has a downward projection between the valves and the cylinder bore extending substantially into proximity with the cylinder block from the intake valve side of the combustion chamber to near the exhaust valve side thereof, said extension having an abruptly descending face on the side thereof presented toward the valves, whereby the valves work in a combustion chamber part which is in communication with the combustion chamber part over the cylinder bore only through a narrow passage left under said projection and through a passage between said projection and the exhaust valve side of the combustion chamber, the side of said projection away from the valves being formed into substantially arcuate alternate step and riser surfaces producing gradual increase in height in the direction away from said valves to a position about centrally over the cylinder bore, and the height of the combustion chamber decreasing therefrom by a gradual taper to the side thereof opposite the engine valves.

6. In an internal combustion engine, a wall portion forming a combustion chamber, having a part over the valves and a part over the cylinder, and means of communication between said combustion chamber parts including a constricted opening and a relatively enlarged opening, and serving to retard the passage of gases and flame propagation through said constricted opening thereof and to accelerate the passage of said gases and flame propagation through said enlarged opening thereof.

7. In an internal combustion engine, a wall portion forming a combustion chamber having a part over the inlet and exhaust valves and a part over the cylinder bore, a barrier disposed between said combustion chamber parts on the side adjacent to the inlet valve, said wall portion and said barrier forming an opening at an end of said barrier on the side adjacent to the exhaust valve to provide communication between said combustion chamber parts; the part of said combustion chamber above the cylinder bore having a wall portion including a series of step-like surfaces varying in distance from the cylinder bore.

8. In an internal combustion engine, a cylinder block having a cylinder bore, valves, a wall portion forming a combustion chamber having a part over said cylinder bore and a part over said valves, and means providing a relatively narrow passage between said parts; the part of said combustion chamber over said cylinder bore having a step-like wall portion varying in distance from the cylinder bore.

9. In an internal combustion engine, a cylinder block having a cylinder bore, valves, a wall portion forming a combustion chamber having a part over said cylinder bore and a part over said valves, and having a constricted passage between said parts and a relatively enlarged passage therebetween; the part of said combustion chamber over said cylinder bore having a stepped wall portion disposed in alignment with one of said passages and varying in distance from said cylinder bore.

10. In an internal combustion engine, a cylinder block having a cylinder bore, valves, a wall portion forming a combustion chamber having a part over said cylinder bore and a part over said valves, and having a relatively narrow passage between said parts; the height of the ceiling of the combustion chamber over the cylinder bore increasing by steps away from said passage.

11. In an internal combustion engine, a cylinder block having a cylinder bore, intake and exhaust valves, a wall portion forming a combustion chamber having a part over said cylinder bore and a part over said valves and having a large passage therebetween at the exhaust valve side and a relatively constricted passage therebetween towards the inlet valve side; the height of the combustion chamber part over the cylinder bore increasing by steps away from the valve containing part of said combustion chamber.

12. In an internal combustion engine, a wall portion forming a combustion chamber having a part over the valves and a part over the cylinder, means of communication between combustion chamber parts including a constricted opening and a relatively enlarged opening, and serving to retard the passage of the charge and flame propagation through said constricted opening and to accelerate the passage thereof through said enlarged opening, and means within the part of said combustion chamber associated with the cylinder and cooperating with said openings to reduce the tendency of the fuel charge to detonate.

13. In an internal combustion engine, a cylinder block having a cylinder bore, intake and exhaust valves at one side of said cylinder bore, a wall portion forming a combustion chamber common to said cylinder bore and said valves, and a barrier depending from the ceiling of said combustion chamber intermediate said intake valve and the cylinder bore and providing a constricted opening at the base thereof between the part of said combustion chamber over the valves and the part thereof over the cylinder bore, and a relatively enlarged opening between said parts on the side adjacent to said exhaust valve; the wall portion of the part of said combustion chamber over said cylinder bore including a series of alternate step and riser surfaces varying in distance from the cylinder bore in the direction away from one of said openings.

14. In an internal combustion engine, a cylinder block having a cylinder bore, intake and exhaust valves at one side of said cylinder, a wall portion forming a combustion chamber common to said cylinder bore and said valves, and a barrier depending from the ceiling of said combustion chamber intermediate said intake valve and said cylinder bore and projecting from the lateral wall portion of said combustion chamber adjacent to said intake valve and extending towards the opposite wall portion thereof and providing an opening adjacent to said exhaust valve between the portion of said combustion chamber over the valves and the portion thereof over the cylinder bore; said last named portion of the combustion chamber having a ceiling including a series of alternate step and riser surfaces varying in distance from the cylinder bore in the direction away from the valve containing portion of said combustion chamber.

15. In an internal combustion engine, a wall portion forming a combustion chamber having a part adjacent to the valves and a part adjacent to the cylinder bore, and a barrier disposed between said combustion chamber parts for a portion of the width thereof, and having at an end thereof an opening to provide communication between the valve containing part of the combustion chamber and the part thereof over the cylinder bore; certain of said combustion chamber parts having a ceiling of step formation.

16. In an internal combustion engine, a cylinder block having a cylinder bore, laterally disposed inlet and exhaust valves, a wall portion forming a combustion chamber having a part over the cylinder bore and a part over said valves, a barrier disposed between said combustion chamber parts on the side adjacent to the inlet valve, and providing an opening between said parts on the side adjacent to the exhaust valve, and a spark plug disposed in the part of said combustion chamber over said valves adjacent to said intake valve; certain of said combustion chamber parts increasing in volume in the direction of flame propagation.

17. In an internal combustion engine, a wall portion forming a combustion chamber having a part over the valves and a part over the cylinder, and means of communication between said parts including a constricted opening and a relatively enlarged opening, and serving to retard the passage of gases and flame propagation through said constricted opening thereof and to accelerate the passage of said gases and flame propagation through said enlarged opening; certain of said combustion chamber parts increasing in volume in the direction of the flame propagation.

18. In an internal combustion engine, a cylinder block having a cylinder bore, laterally disposed inlet and exhaust valves, a wall portion forming a combustion chamber having a part over the cylinder bore and a part over said valves; said parts having a constricted passage therebetween, and an enlarged passage therebetween, and ignition means in the valve part of said combustion chamber; certain of said combustion chamber parts having a ceiling of step formation increasing in height in the direction of flame propagation.

In testimony whereof, I have signed my name hereto.

ARLINGTON MOORE.